United States Patent
Kimura et al.

(10) Patent No.: US 10,622,865 B2
(45) Date of Patent: Apr. 14, 2020

(54) MOTOR DEVICE EQUIPPED WITH SPEED REDUCTION MECHANISM

(71) Applicant: Mitsuba Corporation, Kiryu-shi, Gunma (JP)

(72) Inventors: Toshiyuki Kimura, Kiryu (JP); Masayuki Ota, Kiryu (JP)

(73) Assignee: Mitsuba Corporation, Gunma (JP)

(*) Notice: Subject to any disclaimer, the term of this patent is extended or adjusted under 35 U.S.C. 154(b) by 449 days.

(21) Appl. No.: 15/509,675

(22) PCT Filed: Sep. 2, 2015

(86) PCT No.: PCT/JP2015/074924
§ 371 (c)(1),
(2) Date: Mar. 8, 2017

(87) PCT Pub. No.: WO2016/039234
PCT Pub. Date: Mar. 17, 2016

(65) Prior Publication Data
US 2017/0302134 A1 Oct. 19, 2017

(30) Foreign Application Priority Data
Sep. 12, 2014 (JP) .................. 2014-186368

(51) Int. Cl.
*H02K 5/24* (2006.01)
*H02K 7/116* (2006.01)
*H02K 5/04* (2006.01)

(52) U.S. Cl.
CPC ............ *H02K 5/24* (2013.01); *H02K 5/04* (2013.01); *H02K 7/116* (2013.01); *H02K 7/1166* (2013.01)

(58) Field of Classification Search
CPC . H02K 5/24; H02K 5/04; H02K 7/116; H02K 7/1166; F16H 1/3732;
(Continued)

(56) References Cited

U.S. PATENT DOCUMENTS 5,212,999 A * 5/1993 Kitada ............... B60S 1/08
   384/223
7,453,222 B2 * 11/2008 Kanai ............... B60J 7/0573
   318/15
(Continued)

FOREIGN PATENT DOCUMENTS

CN    101137526 A     3/2008
EP    0795699 A1 *   9/1997 ........... B60J 7/0573
(Continued)

OTHER PUBLICATIONS

JP-2009208598-A (English Translation) (Year: 2009).*
(Continued)

*Primary Examiner* — Jermele M Hollington
*Assistant Examiner* — Alexander Moraza
(74) *Attorney, Agent, or Firm* — Wood Herron & Evans LLP

(57) ABSTRACT

Provided is a motor device (1) equipped with a speed reduction mechanism including: an electric motor (2); a case (30) configured to receive a speed reduction mechanism (20) used to reduce a speed of rotation of the electric motor (2); and an output shaft (23) provided on one side of the case (30) to surround a rotational central shaft (O) of the electric motor (2) and coupled to the speed reduction mechanism (20), in which, the case (30) has: a main mount (40) provided on the one side of the case (30) and configured to fix the case (30) to a roof; and an auxiliary mount (50) provided on the other side of the case (30) to surround the rotational central shaft (O) of the electric motor (2) and configured to fix the case (30) to the roof, and the mount (50) has: an auxiliary attachment section (52) integrally formed with the case (30); and an auxiliary mount rubber (54) mounted at the auxiliary attachment section (52).

9 Claims, 6 Drawing Sheets

(58) Field of Classification Search
CPC .......... F16H 1/3735; F16H 1/16; F16H 15/08; F16H 55/14; F16H 57/0006; F16H 57/028; B60S 1/08; B60S 1/26; B60S 1/166; E05F 15/697; B60J 7/057; B60J 7/0573
USPC .................. 310/51, 89, 83, 99; 318/12, 15; 296/223; 74/443, 574.4, 604, 606 R; 248/609; 267/141.7

See application file for complete search history.

(56) References Cited

U.S. PATENT DOCUMENTS

| | | | | |
|---|---|---|---|---|
| 2006/0284450 | A1* | 12/2006 | Regnier | B60J 7/024 296/216.01 |
| 2007/0234847 | A1* | 10/2007 | Takada | B60S 1/0438 74/606 R |
| 2011/0120740 | A1* | 5/2011 | Moreno | B25D 17/043 173/162.2 |

FOREIGN PATENT DOCUMENTS

| | | | |
|---|---|---|---|
| JP | 2004129484 A | | 4/2004 |
| JP | 2007252075 A | * | 9/2007 |
| JP | 2008247171 A | | 10/2008 |
| JP | 2008289331 A | | 11/2008 |
| JP | 2009194995 A | * | 8/2009 |
| JP | 2009194995 A | | 8/2009 |
| JP | 2009208598 A | * | 9/2009 |
| JP | 2010148276 A | | 7/2010 |
| JP | 2011234489 A | | 11/2011 |
| JP | 2014003747 A | | 1/2014 |

OTHER PUBLICATIONS

JP-2009194995-A (English Translation) (Year: 2009).*
JP-2007252075-A (English Translation) (Year: 2007).*
Chinese Patent Office, Office Action issued in Chinese Patent Application No. 201580047900.4 dated Jun. 5, 2018, 9 pages.
PCT Office, International Search Report issued in corresponding PCT Application No. PCT/JP2015/074924 dated Nov. 17, 2015, 2 pages.
PCT Office, International Preliminary Report on Patentability issued in corresponding PCT Application No. PCT/JP2015/074924 dated Dec. 20, 2016, 9 pages.

* cited by examiner

MOTOR DEVICE EQUIPPED WITH SPEED REDUCTION MECHANISM

TECHNICAL FIELD

The present invention relates to a motor device equipped with a speed reduction mechanism.

The present application claims priority based on Japanese Patent Application No. 2014-186368 filed on Sep. 12, 2014, the contents of which are incorporated herein by reference.

BACKGROUND ART

In the related art, a motor device equipped with a speed reduction mechanism, in which an electric motor is integrally formed with a case in which a speed reduction gear such as, for example, a worm and a worm wheel is included, and which receives a speed reduction mechanism coupled to a restating shaft of the electric motor, is known. This type of motor device equipped with a speed reduction mechanism is used for driving various devices.

For example, Patent Document 1 discloses a sunroof driving device in which a motor device equipped with a speed reduction mechanism is provided at a roof of a vehicle and a roof panel provided at the roof is driven using the motor device equipped with the speed reduction mechanism. The motor device equipped with the speed reduction mechanism has a mount configured to attach the motor device equipped with the speed reduction mechanism to the roof using, for example, bolts, However, in the related art, generation of vibration due to a meshing reaction force of gears between, for example, a worm and a worm wheel or the like when the motor device equipped with the speed reduction mechanism is driven, vibration when an electric motor itself is rotatably driven, or the like is known. Vibration when the motor device equipped with the speed reduction mechanism is driven is transferred to the roof via the mount of the motor device equipped with the speed reduction mechanism, and thus noise occurs.

RELATED ART DOCUMENT

Patent Document

Patent Document 1: Japanese Unexamined Patent Application, First Publication No. 2011-234489

SUMMARY

Problems to be Solved by the Invention

However, in the related art, no measures concerning noise are stated clearly. Particularly, when the number of mounts is increased to firmly fix the motor device equipped with the speed reduction mechanism to a roof, the number of transfer paths for vibration increases. Thus, there is a concern that noise will increase.

Also, in the related art, an attachment section of the motor device equipped with the speed reduction mechanism with respect to the roof is provided only on one side thereof around a rotating shaft of the electric motor. For this reason, when a great force is applied to the motor device equipped with the speed reduction mechanism due to, for example, collision of a vehicle and the like, there is a concern that a force will be applied around the attachment section so that the motor device equipped with the speed reduction mechanism rotates and a position of the motor device equipped with the speed reduction mechanism deviates.

The present invention was made in view of the above-described circumstances, and an object of the present invention is to provide a motor device equipped with a speed reduction mechanism in which the transfer of vibration to attaching object is suppressed, and thus noise can be reduced and positional deviation of the motor device equipped with the speed reduction mechanism can be prevented even when a great force is applied.

Means for Solving the Problem

According to a first aspect of the present invention, a motor device equipped with a speed reduction mechanism includes: an electric motor; a case configured to receive a speed reduction mechanism used to reduce a speed of rotation of the electric motor; and an output shaft provided on one side of the case to surround a rotational central shaft of the electric motor and coupled to the speed reduction mechanism, wherein the case has: a main mount provided on the one side of the case and configured to fix the case to an attaching object; and an auxiliary mount provided on the other side of the case to surround the rotational central shaft of the electric motor and configured to fix the case to the attaching object, and the auxiliary mount has: an auxiliary attachment section integrally formed with the case; and an auxiliary mount rubber mounted at the auxiliary attachment section.

With such a constitution, since the auxiliary mount has the auxiliary attachment section integrally formed with the case and the auxiliary mount rubber, vibration transferred to the attaching object via the auxiliary mount can be reduced when vibration transferred to the attaching object via the main mount is compared with vibration transferred to the attaching object via the auxiliary mount at a time of operating the motor device equipped with the speed reduction mechanism. The transfer of vibration to the attaching object when the motor device equipped with the speed reduction mechanism is operated is suppressed, and thus noise can be reduced. Also, a load can be distributed using the main mount and the auxiliary mount even when a great force is applied to the motor device equipped with the speed reduction mechanism. Therefore, the motor device equipped with the speed reduction mechanism is prevented from rotating around the main mount, and thus positional deviation of the motor device equipped with the speed reduction mechanism can be prevented.

According to a second aspect of the present invention, in the motor device equipped with the speed reduction mechanism related to the first aspect of the present invention, the motor device equipped with the speed reduction mechanism further includes: a control device configured to control the electric motor, wherein a control device receiving section configured to receive the control device between the main mount and the auxiliary mount is provided in the case.

With such a constitution, since the control device receiving section configured to receive the control device is provided between the main mount and the auxiliary mount, strength of the case of the motor device equipped with the speed reduction mechanism including the control device can be improved. Thus, the motor device equipped with the speed reduction mechanism is prevented from rotating around the main mount, and thus positional deviation of the motor device equipped with the speed reduction mechanism can be reliably prevented even when a great force is applied to the motor device equipped with the speed reduction mechanism. Also, the control device receiving section has lower rigidity than the speed reduction mechanism section. Thus, the control device receiving section is likely to become a generation source of vibration. However, since there is the control device receiving section between the main mount and the auxiliary mount, rigidity thereof can be secured. Thus, vibration is not easily transferred.

According to a third aspect of the present invention, in the motor device equipped with the speed reduction mechanism related to the first or second aspect of the present invention, a hardness of the auxiliary mount is lower than a hardness of the main mount.

With such a constitution, since the hardness of the auxiliary mount is lower than the hardness of the main mount, vibration transferred to the attaching object via the auxiliary mount can be reduced when vibration transferred to the attaching object via the main mount is compared with vibration transferred to the attaching object via the auxiliary mount at a time of operating the motor device equipped with the speed reduction mechanism. The transfer of vibration to the attaching object when the motor device equipped with the speed reduction mechanism is operated is suppressed, and thus noise can be further reduced. Also, a load can be distributed using the main mount and the auxiliary mount even when a great force is applied to the motor device equipped with the speed reduction mechanism. Therefore, the motor device equipped with the speed reduction mechanism is prevented from rotating around the main mount, and thus positional deviation of the motor device equipped with the speed reduction mechanism can be prevented.

According to a fourth aspect of the present invention, in the motor device equipped with the speed reduction mechanism related to any one of the first to third aspects of the present invention, the auxiliary mount rubber is formed in a cylindrical shape, the auxiliary mount includes a collar disposed on an inner side of the auxiliary mount rubber in a radial direction thereof coaxially with the auxiliary mount rubber and being in contact with a fixing member configured to fix the case to the attaching object, and when an axial length of the auxiliary mount rubber is assumed to be L1 and an axial length of the collar is assumed to be L2, the axial length L1 of the auxiliary mount rubber and the axial length L2 of the collar are set so that L1≤L2 is satisfied.

With such a constitution, since the auxiliary mount includes the cylindrical auxiliary mount rubber mounted at the auxiliary attachment section and the collar being in contact with the fixing member configured to fix the case to the attaching object, and the axial length L1 of the auxiliary mount rubber and the axial length L2 of the collar are set so that L1≤L2 is satisfied, the auxiliary mount rubber is not compressed by the fixing member when the case is fixed to the attaching object using the fixing member. Since the auxiliary attachment section of the auxiliary mount is elastically fixed to the attaching object via the auxiliary mount rubber, vibration can be effectively attenuated due to the auxiliary mount. Thus, the transfer of vibration to the attaching object when the motor device equipped with the speed reduction mechanism is operated is further suppressed, and thus noise can be significantly reduced.

According to a fifth aspect of the present invention, in the motor device equipped with the speed reduction mechanism related to the fourth aspect of the present invention, the auxiliary mount rubber includes a small diameter section and a pair of large diameter sections provided on both ends of the small diameter section in a shaft direction thereof, and the auxiliary mount rubber is mounted at the auxiliary attachment section in a state in which a clearance is provided between the auxiliary attachment section and at least one of the small diameter section and the large diameter sections.

With such a constitution, since the auxiliary mount rubber is mounted at the auxiliary attachment section in a state in which a clearance is provided between the auxiliary attachment section and at least one of the small diameter section and the large diameter sections, vibration of the motor device equipped with the speed reduction mechanism can be prevented from being directly transferred from the auxiliary attachment section to the auxiliary mount rubber. Thus, the transfer of vibration to the attaching; object when the motor device equipped with the speed reduction mechanism is operated is further suppressed, and thus noise can be significantly reduced.

According to a sixth aspect of the present invention, in the motor device equipped with the speed reduction mechanism related to the fifth aspect of the present invention, the clearance is provided between the auxiliary attachment section and the small diameter section.

With such a constitution, a clearance is provided between the auxiliary attachment section and the small diameter section so that vibration of the motor device equipped with the speed reduction mechanism can be prevented from being directly transferred from the auxiliary attachment section to the small diameter section of the auxiliary mount rubber. Thus, the transfer of vibration to the attaching object when the motor device equipped with the speed reduction mechanism is operated is further suppressed, and thus noise can be significantly reduced.

According to a seventh aspect of the present invention, in the motor device equipped with the speed reduction mechanism related to the fifth aspect of the present invention, the clearance is provided between the auxiliary attachment section and the large diameter sections.

With such a constitution, a clearance is provided between the auxiliary attachment section and the large diameter sections so that vibration of the motor device equipped with the speed reduction mechanism can be prevented from being directly transferred from the auxiliary attachment section to the large diameter sections of the auxiliary mount rubber. Thus, the transfer of vibration to the attaching object when the motor device equipped with the speed reduction mechanism is operated is further suppressed, and thus noise can be significantly reduced.

According to an eighth aspect of the present invention, in the motor device equipped with the speed reduction mechanism related to any one of the first to seventh aspects of the present invention, the main mount includes: a main attachment section integrally formed with the case; a cylindrical main mount rubber mounted at the main attachment section; and a cylindrical collar disposed on an inner side of the main mount rubber in a radial direction thereof coaxially with the main mount rubber, wherein a hardness of the auxiliary mount rubber is lower than a hardness of the main mount rubber.

With such a constitution, since the hardness of the auxiliary mount rubber is lower than the hardness of the main mount rubber, vibration of the motor device equipped with the speed reduction mechanism can be further attenuated due to the auxiliary mount rubber. Thus, the transfer of vibration to the attaching object when the motor device equipped with the speed reduction mechanism is operated is further suppressed, and thus noise can be significantly reduced.

According to a ninth aspect of the present invention, in the motor device equipped with the speed reduction mechanism related to any one of the first to eighth aspects of the present invention, a pair of main mounts are provided on the one side of the case, and the pair of main mounts are provided so as to face each other to surround the output shaft.

With such a constitution, the perimeter of the output shaft in the motor device equipped with the speed reduction mechanism is firmly fixed to the attaching object using the pair of main mounts. Thus, an output from the output shaft can be reliably transferred, and the transfer of vibration to the attaching object when the motor device equipped with the speed reduction mechanism is operated can be suppressed due to the auxiliary mount. Thus, the transfer of vibration to the attaching object when the motor device equipped with the speed reduction mechanism is operated is suppressed while the motor device equipped with the speed reduction mechanism is reliably fixed to the attaching object, and thus noise can be significantly reduced.

Advantage of the Invention

According to the motor device equipped with the speed reduction mechanism, since an auxiliary mount has an auxiliary attachment section integrally formed with a case and an auxiliary mount rubber, the vibration transferred to the attaching object via the auxiliary mount can be reduced when vibration transferred to an attaching object via a main mount is compared with vibration transferred to the attaching object via the auxiliary mount at a time of operating the motor device equipped with the speed reduction mechanism. Thus, the transfer of vibration to an attaching object when the motor device equipped with the speed reduction mechanism is operated is suppressed, and thus noise can be reduced. Also, even when a great force is applied to the motor device equipped with the speed reduction mechanism, a load can be distributed using the main mount and the auxiliary mount. Thus, the motor device equipped with the speed reduction mechanism is prevented from rotating around the main mount, and thus positional deviation of the motor device equipped with the speed reduction mechanism can be prevented.

DESCRIPTION OF THE EMBODIMENTS

A motor device equipped with a speed reduction mechanism related to an embodiment will be described below.

Hereinafter, first, a sunroof driving device using the motor device equipped with the speed reduction mechanism will be described, and then the motor device equipped with the speed reduction mechanism related to the embodiment will be described in detail.

Figure 1:
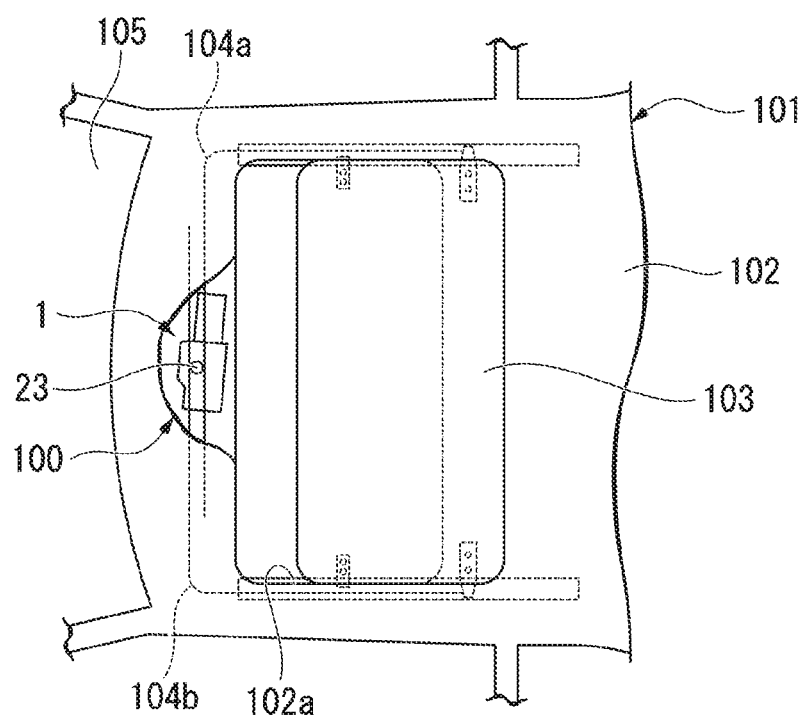
FIG. 1 is a schematic constitution diagram of a sunroof driving device.

FIG. 1 is a schematic constitution diagram of a sunroof driving device 100 related to the embodiment.

As shown in FIG. 1, the sunroof driving device 100 is provided at a roof 102 (corresponding to an "attaching object" of the claims) of a vehicle 101, is configured to drive a roof panel 103 provided at the roof 102, and includes a motor device 1 equipped with a speed reduction mechanism attached to the roof 102.

An opening 102a is formed in the roof 102, and the roof panel 103 is provided in the roof 102 such that the opening 102a can be opened or closed. One ends of cables 104a and 104b are coupled to the roof panel 103. The other ends of the cables 104a and 104b are coupled to an output shaft 23 of the motor device 1 equipped with the speed reduction mechanism. The motor device 1 equipped with the speed reduction mechanism is driven so that the cables 104a and 104b slidably move the roof panel 103, and thus the opening 102a is opened or closed. The motor device 1 equipped with the speed reduction mechanism is disposed between the opening 102a of the roof 102 and a windshield 105.

(Motor Device Equipped with Speed Reduction Mechanism)

Figure 2:
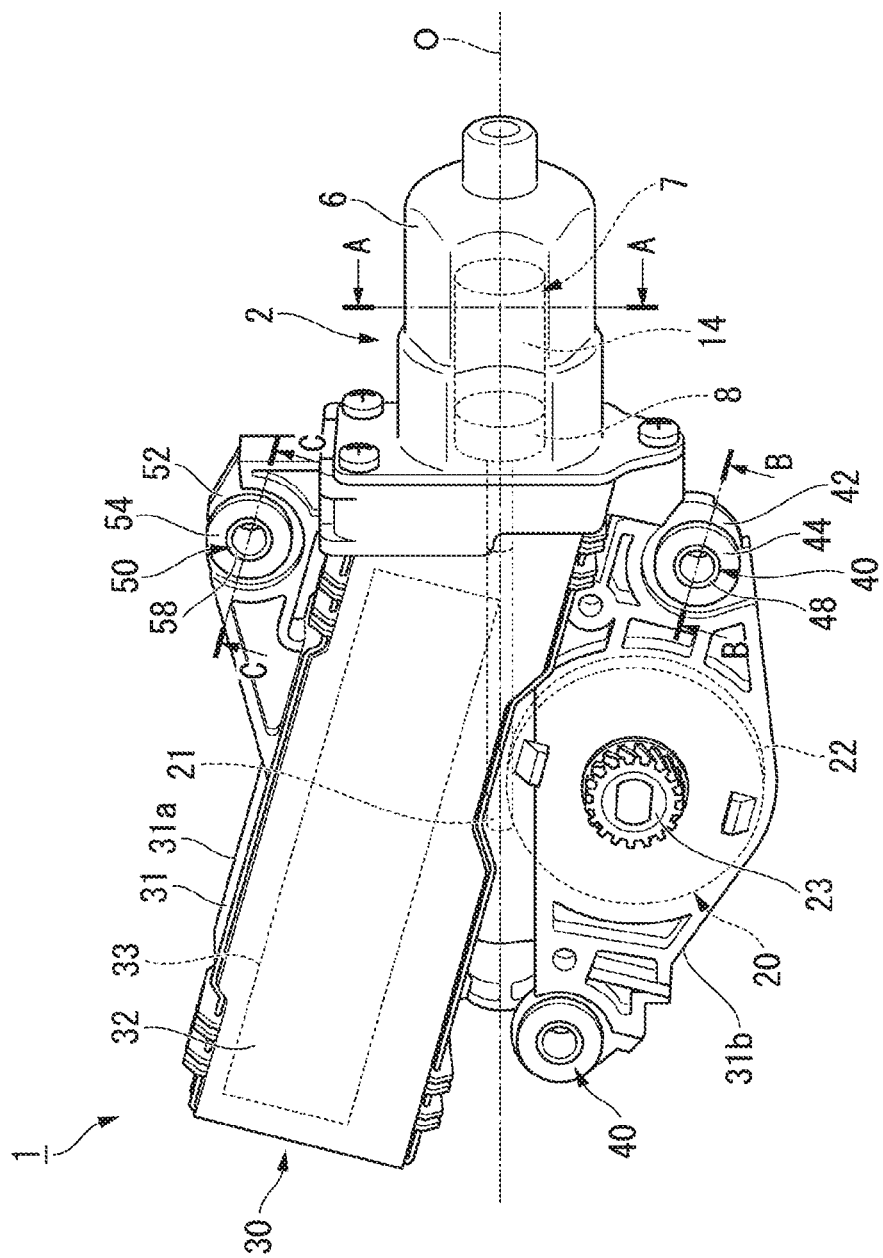
FIG. 2 is a perspective view of a motor device equipped with a speed reduction mechanism related to an embodiment.

FIG. 2 is a perspective view of the motor device 1 equipped with the speed reduction mechanism. Note that a rotational central shaft of an electric motor 2 is denoted with reference numeral O and is illustrated.

As shown in FIG. 2, the motor device 1 equipped with the speed reduction mechanism includes the electric motor 2, a speed reduction mechanism 20 configured to reduce a speed of rotation of the electric motor 2, a control device 33 configured to control the rotation of the electric motor 2, and a case 30 configured to receive the speed reduction mechanism 20 and the control device 33.

The electric motor 2 is a so-called motor with a brush configured to feed power using a brush (not shown) and has a bottomed cylindrical yoke housing 6 and an armature 7 rotatably provided inside the yoke housing 6.

The yoke housing 6 is a member formed of a metallic material such as, for example, aluminum and is attached in a state in which an opening thereof is directed toward the case 30.

Figure 3:
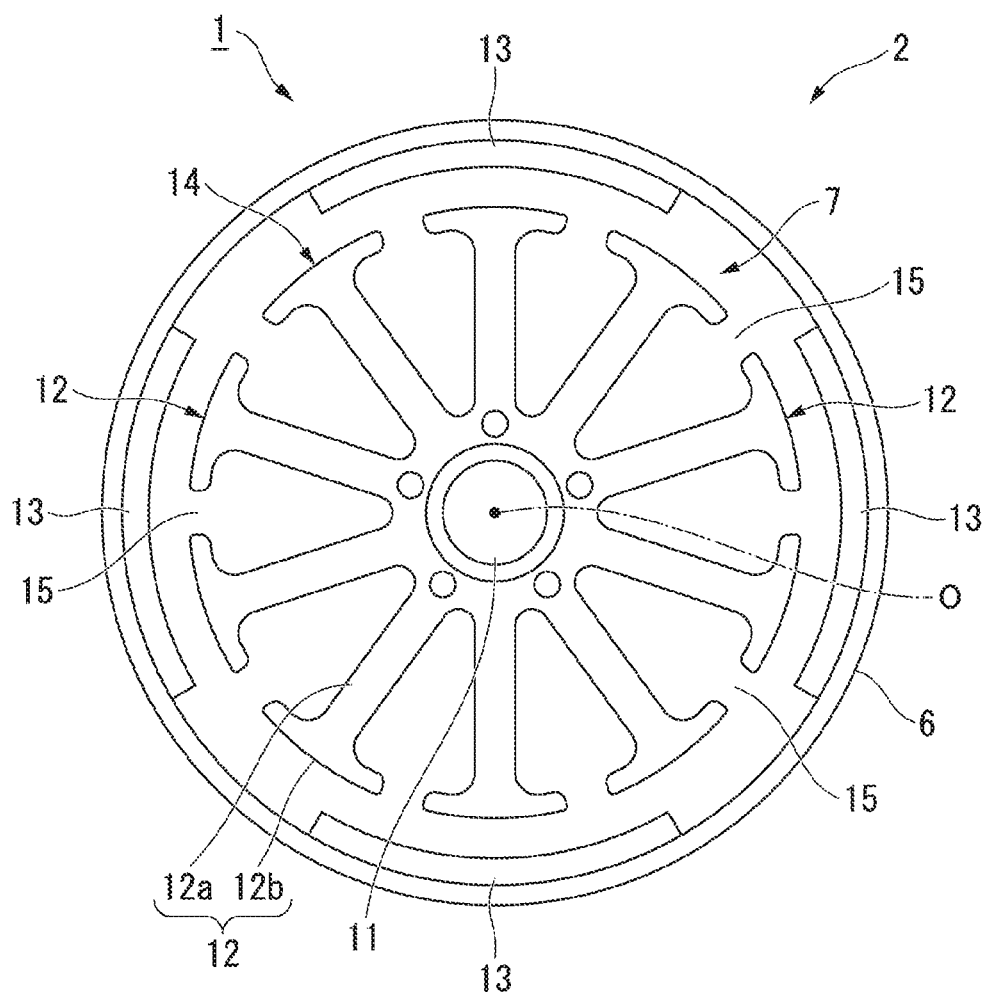
FIG. 3 is a cross-sectional view taken along line A-A of FIG. 2.

FIG. 3 is a cross-sectional view taken along line A-A of FIG. 2.

As shown in FIG. 3, the armature 7 includes a rotating shaft member 11 and an armature core 14 externally fitted and fixed to the rotating shaft member 11. Also, as shown in FIG. 2, the armature 7 has a commutator 8 disposed closer to the speed reduction mechanism 20 side than the armature core 14. The speed reduction mechanism 20 side of the rotating shaft member 11 is rotatably supported by a slide hearing (not shown) provided in the case 30.

As shown in FIG. 3, the armature core 14 is formed such that magnetic materials such as, for example, an electromagnetic steel sheet are stacked and extend in a shaft direction of the rotating shaft member 11 and disposed at a position corresponding to a magnet 13. For example, 10 teeth 12 may be radially formed at the armature core 14 at equal intervals in a circumferential direction thereof.

Each of the teeth 12 is constituted of a winding drum 12a extending outward in a radial direction thereof and an outer circumferential portion 12b provided on a distal end of the winding drum 12a and extending in a circumferential direction thereof. In other words, the outer circumferential portion 12b provided on distal ends of the teeth 12 forms an outer circumferential surface of the armature core 14 and faces the magnet 13.

Slots 15 are formed between the teeth 12 adjacent to each other in the circumferential direction thereof. A winding wire (not shown) made of, for example, copper wires or the like is wound around a predetermined slot 15 among the slots 15. The winding wire is wound around the winding drum 12a of the teeth 12 via an insulator (not shown) serving as an insulating material. A winding start end and a winding finish end of the winding wire are connected to the commutator 8 (refer to FIG. 2).

As shown in FIG. 2, the commutator 8 is a substantially cylindrical member and is disposed closer to the speed reduction mechanism 20 side than the armature core 14 of the armature 7. A plurality of segments (not shown) formed in plate shapes are provided on an outer circumferential surface of the commutator 8 side by side. An end portion of the winding wire is connected to the segments. Also, a brush (not shown) comes into slidable contact with the commutator 8.

Thus, a current is supplied to the winding wire of the armature 7 via the brush and the commutator 8.

The speed reduction mechanism 20 is constituted of a worm 21 to which power of the electric motor 2 is transferred and a worm wheel 22 engaged with the worm 21. The worm wheel 22 and the worm wheel 22 are received in the case 30 which will be described below.

The worm 21 and the worm wheel 22 are members made of, for example, a resin material, a metallic material, or the like and are formed through injection molding, sintering, machining, or the like.

The worm 21 is a shaft type screw gear formed at a distal end of the rotating shaft member 11 and is provided coaxially with a rotational central shaft O of the rotating shaft member 11. The worm 21 is integrally formed with the rotating shaft member 11.

The worm wheel 22 is pivotably supported by a worm wheel shaft (not shown). A helical gear is formed on an outer circumferential surface of the worm wheel 22 and is engaged with the worm 21.

The output shaft 23 is coupled to the worm wheel 22. The output shaft 23 is a member made of, for example, a resin material, a metallic material, or the like as in the worm 21 and the worm wheel 22. The output shaft 23 is provided on one side (a lower side in FIG. 2) of the case 30 to surround the rotational central shaft O of the electric motor 2 and is exposed to an outside of the case 30. A rotating force of the electric motor 2 is transferred to the output shaft 23 via the speed reduction mechanism 20 having the worm 21 and the worm wheel 22. The helical gear is formed on an outer circumferential surface of the output shaft 23. As shown in FIG. 1, the other ends of the cables 104a and 104b are coupled to the output shaft 23 of the motor device 1 equipped with the speed reduction mechanism.

The control device 33 is formed, for example, by implementing an integrated circuit (IC), an amplifier, a rotational sensor configured to detect a rotational angle of the worm wheel 22, or the like on a substrate. The control device 33 performs feedback control on the basis of, for example, a signal from a rotational sensor, issues a command from the IC, and drives the electric motor 2.

(Case)

As shown in FIG. 2, the case 30 is formed of, for example, a resin material and receives the speed reduction mechanism 20 described above. The case 30 in this embodiment is divided into and constituted by a case main body 31 formed in a bathtub shape and a lid 32 configured to cover the case main body 31.

The case 30 has main mounts 40 configured to fix the case 30 (that is, the motor device 1 equipped with the speed reduction mechanism) to the roof 102 (refer to FIG. 1.) of the vehicle 101 and an auxiliary mount 50.

In the motor device 1 equipped with the speed reduction mechanism in this embodiment, the pair of main mounts 40 are provided on one side of the case main body 31 (that is, the case 30) to surround the rotational central shaft O of the electric motor 2, and the auxiliary mount 50 is provided on the other side of the case main body 31 (that is, the case 30) to surround the rotational central shaft O of the electric motor 2.

The control device 33 and the speed reduction mechanism 20 are disposed inside the case main body 31 of the case 30 and the case 30 is covered with the lid 32 so that the control device 33 and the speed reduction mechanism 20 are received inside the case 30.

The case main body 31 has a control device receiving section 31a configured to receive the control device 33 and a speed reduction mechanism receiving section 31b configured to receive the speed reduction mechanism 20. The control device receiving section 31a is formed between the pair of main mounts 40 and the auxiliary mount 50. The control device receiving section 31a is formed in a rectangular shape in a plan view. The control device receiving section 31a is provided so that a longitudinal direction thereof extends in a direction in which the pair of main mounts 40 are arranged. The speed reduction mechanism receiving section 31b is formed between the pair of main mounts 40.

(Main Mounts)

The pair of main mounts 40 and 40 are provided around the rotational central shaft O of the electric motor 2 and face each other around the output shaft 23 at one side of the case main body 31. Here, the pair of main mounts 40 and 40 have the same constitution. Therefore, in the following description, one of the main mounts 40, which is disposed at the electric motor 2 side to surround the output shaft 23, will be described, and the other of the main mounts 40, which is disposed opposite the electric motor 2 to surround the output shaft 23, is not described.

Figure 4:
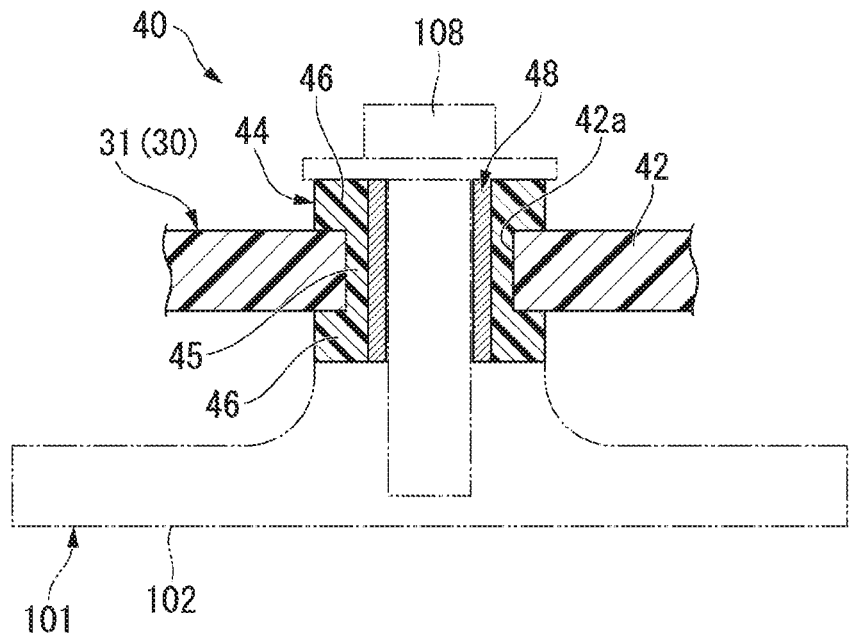
FIG. 4 is a cross-sectional view taken along line B-B of FIG. 2.

FIG. 4 is a cross-sectional view taken along line B-B of FIG. 2. Note that the roof 102 and fixing bolts 108 (corresponding to "fixing members" of the claims) of the vehicle 101 are indicated using chain double dot-dashed lines in FIG. 4.

As shown in FIG. 4, the main mount 40 is formed of a main attachment section 42, a main mount rubber 44, and a collar 48.

The main attachment section 42 has a plate shape and is integrally formed with the case main body 31 of the case 30. A through hole 42a is provided in the main attachment section 42.

The main mount rubber 44 is a member formed in a cylindrical shape using a rubber material such as, for example, nitrile rubber, acrylic rubber, chloropyrene rubber/ethylene propylene rubber, isobutylene, or isoprene rubber, is disposed inside the through hole 42a of the main attachment section 42, and is mounted at the main attachment section 42. A rubber hardness of the main mount rubber 44 is set to, for example, 60 to 90 degrees (in conformity with measurement of JIS K 6253 type A or ISO 7613 type A).

The main mount rubber 44 includes a small diameter section 45 and a pair of large diameter sections 46 and 46 provided on both ends of the small diameter section 45 in a shaft direction thereof.

An outer diameter of the small diameter section 45 is the same as or greater than an inner diameter of the through hole 42a in the main attachment section 42. Thus, the small diameter section 45 of the main mount rubber 44 is disposed and held coaxially with the through hole 42a of the main attachment section 42. Also, a separation distance of the pair of large diameter sections 46 and 46 is the same as or narrower than a thickness of the main attachment section 42. The main attachment section 42 is sandwiched by the pair of large diameter sections 46 and 46 of the main mount rubber 44. Thus, the main mount rubber 44 is firmly mounted at the main attachment section 42.

The collar 48 is a member formed in a cylindrical shape, for example, by rolling a plate-like metallic member. An outer diameter of the collar 48 is, for example, the same as or greater than an inner diameter of the main mount rubber 44. Thus, the collar 48 is disposed and held coaxially with the main mount rubber 44 on an inner side of the main mount rubber 44 in a radial direction thereof. Also, an axial length of the collar 48 is shorter than an axial length of the main mount rubber 44.

The fixing bolts 108 are inserted through the collar 48 of the main mount 40, and the main mount 40 is fastened and fixed to the roof 102. Here, since the axial length of the collar 48 is shorter than the axial length of the main mount rubber 44, the main mount rubber 44 of the main mount 40 is compressed in a shaft direction thereof, and the main mount 40 is fastened and fixed to the roof 102 in a state in which an end portion of the collar 48 is in contact with flange sections of the fixing bolts 108.

(Auxiliary Mount)

Figure 5:
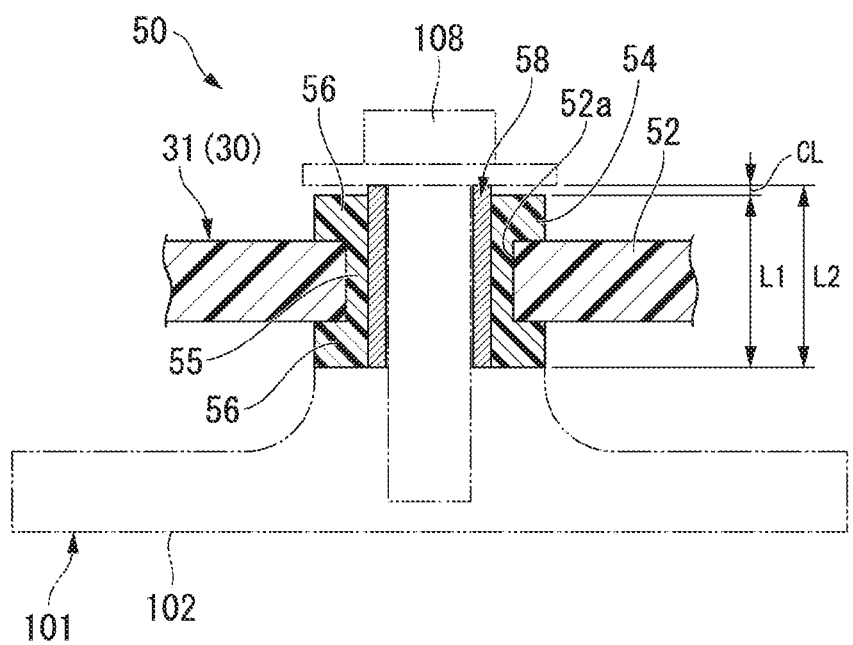
FIG. 5 is a cross-sectional view taken along line C-C of FIG. 2.

FIG. 5 is a cross-sectional view taken along line C-C of FIG. 2. Note that the roof 102 and the fixing bolts 108 (corresponding to the "fixing members" of the claims) of the vehicle 101 are indicated using chain double dot-dashed lines in FIG. 5.

As shown in FIG. 2, the auxiliary mount 50 is disposed to surround the rotational central shaft O of the electric motor 2 and provided on a side which is the other side of the case main body 31 and is opposite one of the main mounts 40.

As shown in FIG. 5, the auxiliary mount 50 is formed of an auxiliary attachment section 52, an auxiliary mount rubber 54, and a collar 58.

The auxiliary attachment section 52 has a plate shape as in the main attachment section 42 and is integrally formed with the case main body 31 of the case 30. Through hole 52a are provided in the auxiliary attachment section 52.

The auxiliary mount rubber 54 is a member formed in a cylindrical shape using a rubber material such as, for example, nitrile rubber, acrylic rubber, chloropyrene rubber/ethylene propylene rubber, isobutylene, or isoprene rubber, is disposed inside the through hole 52a of the auxiliary attachment section 52, and is mounted at the auxiliary attachment section 52. Rubber hardness of the auxiliary mount rubber 54 is set to, for example, 30 to 60 degrees (in conformity with measurement of JIS K 6253 type A or ISO 7613 type A) and is lower than the rubber hardness of the main mount rubber 44.

The auxiliary mount rubber 54 includes a small diameter section 55 and a pair of large diameter sections 56 and 56 provided on both sides of the small diameter section 55 in a shaft direction thereof.

An outer diameter of the small diameter section 55 is the same as or greater than an inner diameter of the through hole 52a in the auxiliary attachment section 52. Thus, the small diameter section 55 of the auxiliary mount rubber 54 is disposed and held coaxially with the through hole 52a of the auxiliary attachment section 52. Also, a separation distance between the pair of large diameter sections 56 and 56 is the same as or narrower than a thickness of the auxiliary attachment section 52. The auxiliary attachment section 52 is sandwiched by the pair of large diameter sections 56 and 56 of the auxiliary mount rubber 54. Thus, the auxiliary mount rubber 54 is firmly mounted at the auxiliary attachment section 52.

The collar 58 is a member formed in a cylindrical shape, for example, by rolling a plate-like metallic member. An outer diameter of the collar 58 is, for example, the same as or greater than an inner diameter of the auxiliary mount rubber 54. Thus, the collar 58 is disposed and held coaxially with the auxiliary mount rubber 54 on an inner side of the auxiliary mount rubber 54 in a radial direction thereof.

Here, an axial length of the collar 58 is longer than an axial length of the auxiliary mount rubber 54. In other words, when the axial length of the auxiliary mount rubber 54 is assumed to be L1 and the axial length of the collar 58 is assumed to be L2, the axial length L1 of the auxiliary mount rubber 54 and the axial length L2 of the collar 58 are set so that:

$$L1 \leq L2 \tag{1}$$

is satisfied.

The fixing bolts 108 are inserted through the collar 58 of the auxiliary mount 50 and the auxiliary mount 50 is fastened and fixed to the roof 102. Here, since the axial length of the collar 58 is longer than the axial length of the auxiliary mount rubber 54, the auxiliary mount 50 is fastened and fixed to the roof 102 in a state in which the auxiliary mount 50 is in contact with the flange sections of the fixing bolts 108 while a clearance CL is provided between the large diameter sections 56 of the auxiliary mount rubber 54 and an end portion of the collar 58.

The main mount 40 is fastened and fixed to the roof 102 in a state in which the main mount rubber 44 of the main mount 40 is compressed. On the other hand, the auxiliary mount 50 is fastened and fixed to the roof 102 without compressing the auxiliary mount rubber 54 in a state in which the clearance CL is provided between the large diameter sections 56 of the auxiliary mount rubber 54 and the end portion of the collar 58. At this time, since the auxiliary mount rubber 54 is not compressed, rubber hardness thereof is lower than that of the compressed main mount rubber 44. In other words, hardness of the auxiliary mount 50 is lower than hardness of the main mount 40. Thus, the vibration transferred to the roof 102 via the auxiliary mount 50 is reduced when vibration transferred to the roof 102 via the main mount 40 is compared with vibration transferred to the roof 102 via the auxiliary mount 50 at a time of operating the motor device 1 equipped with the speed reduction mechanism.

According to the above-described embodiment, since the auxiliary mount 50 has the auxiliary attachment section 52 integrally formed with the case 30 and the auxiliary mount rubber 54, the vibration transferred to the roof 102 via the auxiliary mount 50 can be reduced when the vibration transferred to the roof 102 via the main mount 40 is compared with the vibration transferred to the roof 102 via the auxiliary mount 50 at the time of operating the motor device 1 equipped with the speed reduction mechanism.

Thus, the transfer of vibration to the roof 102 when the motor device 1 equipped with the speed reduction mechanism is operated is suppressed, and thus noise can be reduced. Also, even when a great force is applied to the motor device 1 equipped with the speed reduction mechanism, a load can be distributed due to the main mount 40 and the auxiliary mount 50. Thus, the motor device 1 equipped with the speed reduction mechanism is prevented from rotating around the main mount 40, and thus positional deviation of the motor device 1 equipped with the speed reduction mechanism can be prevented.

Since the control device receiving section 31*a* configured to receive the control device 33 is provided between the main mount 40 and the auxiliary mount 50, strength of the case 30 in the motor device 1 equipped with the speed reduction mechanism including the control device 33 can be improved. Thus, even when a great force is applied to the motor device 1 equipped with the speed reduction mechanism, the motor device 1 equipped with the speed reduction mechanism is prevented from rotating around the main mount 40, and thus the positional deviation of the motor device 1 equipped with the speed reduction mechanism can be reliably prevented. Also, the control device receiving section 31*a* has lower rigidity than a speed reduction mechanism section. Thus, the control device receiving section 31*a* is likely to become a generation source of vibration. However, since there is the control device receiving section 31*a* between the main mount 40 and the auxiliary mount 50, rigidity thereof can be secured. Thus, vibration is not easily transferred.

Furthermore, since the hardness of the auxiliary mount 50 is lower than the hardness of the main mount 40, the vibration transferred to the roof 102 via the auxiliary mount 50 can be reduced when the vibration transferred to the roof 102 via the main mount 40 is compared with the vibration transferred to the roof 102 via the auxiliary mount 50 at the time of operating the motor device 1 equipped with the speed reduction mechanism. Thus, the transfer of vibration to the roof 102 when the motor device 1 equipped with the speed reduction mechanism is operated is suppressed, and thus noise can be further reduced. Also, even when a great force is applied to the motor device 1 equipped with the speed reduction mechanism, a load can be distributed due to the main mount 40 and the auxiliary mount 50. Thus, the motor device 1 equipped with the speed reduction mechanism is prevented from rotating around the main mount 40, and thus the positional deviation of the motor device 1 equipped with the speed reduction mechanism can be prevented.

Since the cylindrical auxiliary mount rubber 54 mounted at the auxiliary attachment section 52 and the collar 58 with which the fixing bolts 108 used to fix the case 30 to the roof 102 are in contact are provided, and the axial length L1 of the auxiliary mount rubber 54 and the axial length L2 of the collar 58 are set so that:

$$L1 \leq L2 \quad (1)$$

is satisfied, the auxiliary mount rubber 54 is not compressed by the fixing belts 108 when the case 30 is fixed to the roof 102 using the fixing bolts 108. Since the auxiliary attachment section 52 of the auxiliary mount 50 is elastically fixed to the roof 102 via the auxiliary mount rubber 54, the vibration can be effectively attenuated due to the auxiliary mount 50. Thus, the transfer of vibration to the roof 102 when the motor device 1 equipped with the speed reduction mechanism is operated is further suppressed, and thus noise can be significantly reduced.

Since hardness of the auxiliary mount rubber 54 is lower than hardness of the main mount rubber 44, vibration of the motor device 1 equipped with the speed reduction mechanism can be further attenuated due to the auxiliary mount rubber 54. Thus, the transfer of vibration to the roof 102 when the motor device 1 equipped with the speed reduction mechanism is operated is further suppressed, and thus noise can be significantly reduced.

The perimeter of the output shaft 23 in the motor device 1 equipped with the speed reduction mechanism is firmly fixed to the roof 102 using the pair of main mounts 40 and 40. Thus, an output from the output shaft 23 can be transferred, and the transfer of vibration to the roof 102 when the motor device 1 equipped with the speed reduction mechanism is operated can be suppressed due to the auxiliary mount 50. Thus, the transfer of vibration to the roof 102 when the motor device 1 equipped with the speed reduction mechanism is operated is suppressed while the motor device 1 equipped with the speed reduction mechanism is reliably fixed to the roof 102, and thus noise can be significantly reduced.

(Modified Examples of Embodiment)

Figure 6:
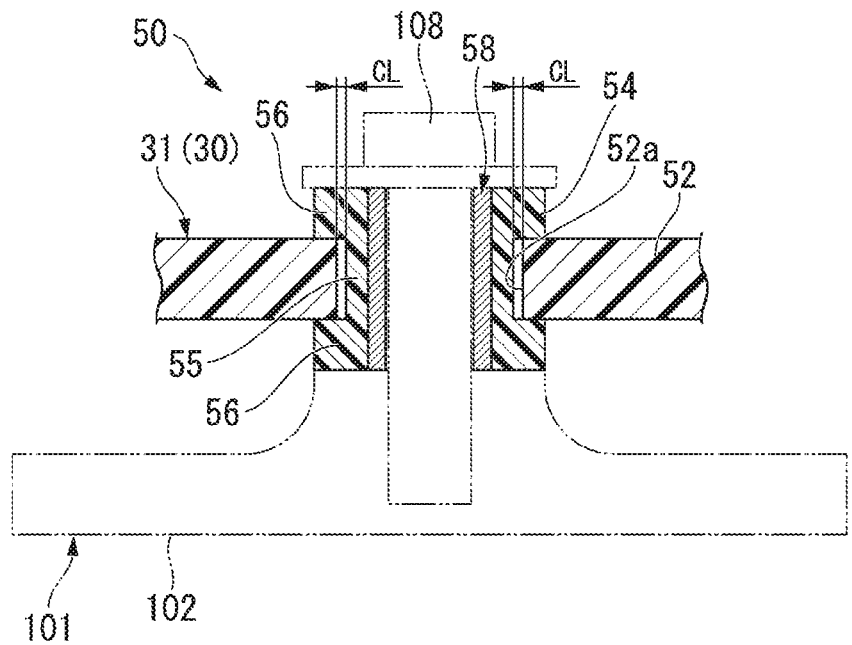
FIG. 6 is a view for describing an auxiliary mount of a motor device equipped with a speed reduction mechanism related to a first modified example of the embodiment.

FIG. 6 is a view for describing an auxiliary mount 50 of a motor device 1. equipped with a speed reduction mechanism related to a first modified example of the embodiment, and is a view corresponding to the cross-sectional view taken along line C-C of FIG. 2.

Figure 7:
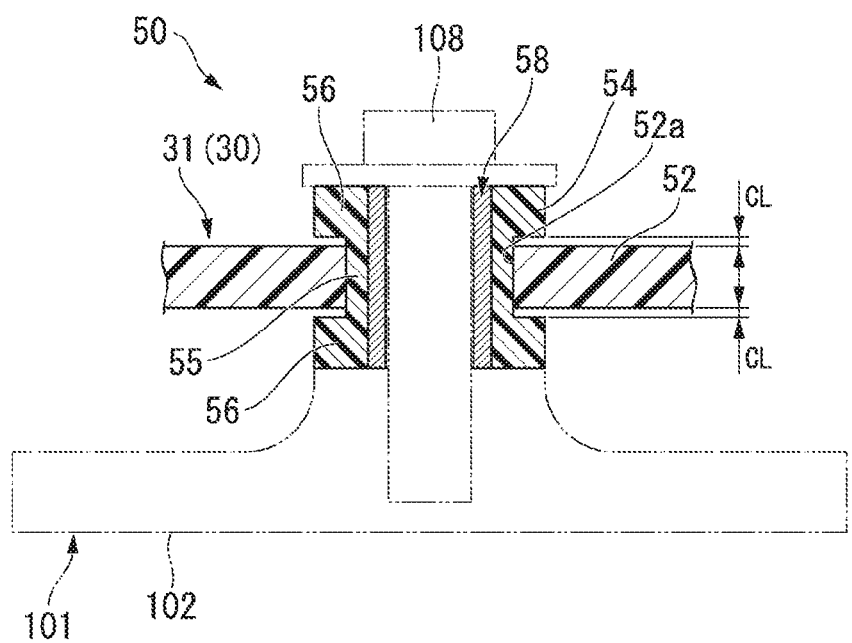
FIG. 7 is a view for describing an auxiliary mount of a motor device equipped with a speed reduction mechanism related to a second modified example of the embodiment.

FIG. 7 is a view for describing an auxiliary mount 50 of a motor device 1 equipped with a speed reduction mechanism related to a second modified example of the embodiment, and is a view corresponding to the cross-sectional view taken along line C-C of FIG. 2.

Next, the auxiliary mount 50 of the motor device 1 equipped with the speed reduction mechanism related to the modified examples of the embodiment will be described. Note that detailed description of constituent elements which are the same as those of the embodiment will be omitted.

In the embodiment, the axial length of the collar 58 is longer than the axial length of the auxiliary mount rubber 54, and the auxiliary mount 50 is fastened and fixed to the roof 102 in a state in which the auxiliary mount 50 is in contact with the flange sections of the fixing bolts 108 while the clearance CL is provided between the large diameter sections 56 of the auxiliary mount rubber 54 and the end portion of the collar 58 (refer to FIG. 5).

On the other hand, as shown in FIGS. 6 and 7, in the auxiliary mount 50, an auxiliary mount rubber 54 may be mounted at an auxiliary attachment section 52 and be fastened and fixed to a roof 102 in a state in which a clearance CL is provided between the auxiliary attachment section 52 and at least one of a small diameter section 55 and a large diameter sections 56 of the auxiliary mount rubber 54.

As shown in FIG. 6, in the first modified example of the embodiment, the inner diameter of a through hole 52*a* in the auxiliary attachment section 52 is larger than the outer diameter of the small diameter section 55 in the auxiliary mount rubber 54. Thus, the auxiliary mount 50 is fastened and fixed to the roof 102 in a state in which a clearance CL is provided between the through hole 52*a* of the auxiliary attachment section 52 and the small diameter section 55 of the auxiliary mount rubber 54.

According to the modified examples of the embodiment, a clearance CL is provided between the auxiliary attachment section 52 and the small diameter section 55 so that vibration of the motor device 1 equipped with the speed reduction mechanism can be prevented from being directly transferred from the auxiliary attachment section 52 to the small diameter section 55 of the auxiliary mount rubber 54. Thus, the transfer of vibration to the roof 102 when the motor device 1 equipped with the speed reduction mechanism is operated is further suppressed, and thus noise can be significantly reduced.

As shown in FIG. 7, in the second modified example of the embodiment, a separation distance of a pair of the large diameter sections 56 and 56 is wider than a thickness of the auxiliary attachment section 52. Thus, the auxiliary mount 50 is fastened and fixed to the roof 102 in a state in which the clearance CL is provided between the auxiliary attachment section 52 and the lame diameter sections 56 of the auxiliary mount rubber 54.

According to the second modified example of the embodiment, the clearance CL is provided between the auxiliary attachment section 52 and the large diameter sections 56 so that vibration of the motor device 1 equipped with the speed reduction mechanism can be prevented from being directly transferred from the auxiliary attachment section 52 to the large diameter sections 56 of the auxiliary mount rubber 54. Thus, the transfer of vibration to the roof 102 when the motor device 1 equipped with tile speed reduction mechanism is operated is further suppressed, and thus noise can be significantly reduced.

Note that the technical scope of the present invention is not limited to the above embodiments, and appropriate modifications can be added without departing from the scope of the present invention.

Figure 8:
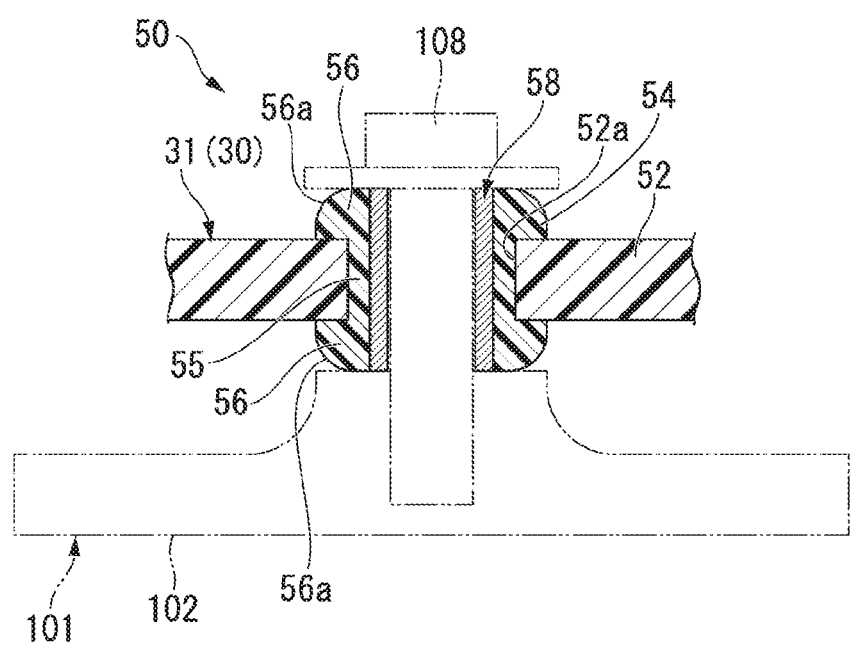
FIG. 8 is a view for describing an auxiliary mount of a motor device equipped with a speed reduction mechanism related to another embodiment.

FIG. 8 is a view for describing an auxiliary mount 50 of a motor device 1 equipped with a speed reduction mechanism related to another embodiment.

As shown in FIG. 8, a chamfered section 56a is provided by chamfering an outer edge in a radial direction thereof related to both end surfaces of large diameter sections 56 in an auxiliary mount rubber 54 so that the size of contact areas between fixing bolts 108 and a roof 102 with the auxiliary mount rubber 54 is reduced, and thus rubber hardness of the auxiliary mount rubber 54 can be reduced when the auxiliary mount rubber 54 is fastened and fixed. Also in this case, the same effect as the embodiment can be attained.

Shapes, materials, and the like of an auxiliary attachment section 52, the auxiliary mount rubber 54, a collar 58, or the like constituting the auxiliary mount 50 are not limited to the embodiment. Thus, for example, the auxiliary mount rubber 54 may be made of a soft resin material. Also, the collar 58 may be formed by cutting a pipe member made of a metallic material.

In the embodiment, a case in which the motor device 1 equipped with the speed reduction mechanism is applied to the sunroof driving device 100 has been described, but application of the motor device 1 equipped with the speed reduction mechanism is not limited to the sunroof driving device 100. Thus, the motor device 1 equipped with the speed reduction mechanism of the present invention may be applied to, for example, a power window device configured to drive a glass window of a vehicle.

Moreover, the constituent elements of the above-mentioned embodiment can be appropriately substituted with known constituent elements without departing from the gist of the present invention.

INDUSTRIAL APPLICABILITY

According to the motor device equipped with the speed reduction mechanism, the transfer of vibration to an attaching object is suppressed. Thus, noise can be reduced, and thus positional deviation of the motor device equipped with the speed reduction mechanism can be prevented even when a great force is applied.

BRIEF DESCRIPTION OF THE REFERENCE SYMBOLS

1: Motor device equipped with speed reduction mechanism
2: Electric motor
20: Speed reduction mechanism
23: Output shaft
30: Case
31a: Control device receiving section
33: Control device
40: Main mount
42: Main attachment section
44: Main mount rubber
48: Collar
50: Auxiliary mount
52: Auxiliary attachment section
54: Auxiliary mount rubber
55: Small diameter section
56: Large diameter section
58: Collar
102: Roof (attaching object)
108: Fixing bolt (fixing member)
CL: Clearance
O: Rotational central shaft

The invention claimed is:

1. A motor device equipped with a speed reduction mechanism attached to a roof of a vehicle and disposed between an opening of the roof and a windshield comprising:
   an electric motor;
   a case configured to receive a speed reduction mechanism used to reduce a speed of rotation of the electric motor; and
   an output shaft provided on one side of the case and a side of a rotational central shaft of the electric motor and coupled to the speed reduction mechanism,
   wherein the case has:
   a pair of main mounts provided on the one side of the case and configured to fix the case to an attaching object; and
   an auxiliary mount provided on an opposite side of the case, in the other side of the rotational central shaft of the electric motor from where the main mounts are located, and configured to fix the case to the attaching object,
   the auxiliary mount has:
   an auxiliary attachment section integrally formed with the case; and
   an auxiliary mount rubber mounted at the auxiliary attachment section,
   a control device configured to control the electric motor is provided,
   a control device receiving section configured to receive the control device between the pair of main mounts and the auxiliary mount is provided in the case,
   a mounting surface of a substrate of the control device is provided to face in an axial direction of the output shaft,
   the pair of main mounts are disposed to be arranged in a direction which is different from an axial direction of the rotational central shaft, the control device receiving section is formed in a rectangular shape having a longitudinal axis in a plan view when viewed along an axis of the output shaft, and the control device receiving section is provided so that the longitudinal axis of the control device receiving section is along a direction in which the pair of main mounts are arranged.

2. The motor device equipped with the speed reduction mechanism according to claim 1, wherein a speed reduction mechanism receiving section configured to receive the speed reduction mechanism is provided at a position overlapping with a straight line connecting centers of the pair of main mounts.

3. The motor device equipped with the speed reduction mechanism according to claim 1, wherein a hardness of the auxiliary mount is lower than a hardness of the main mount.

4. The motor device equipped with the speed reduction mechanism according to claim 1, wherein the auxiliary mount rubber is formed in a cylindrical shape, the auxiliary mount includes a collar disposed on an inner side of the auxiliary mount rubber in a radial direction thereof coaxially with the auxiliary mount rubber and being in contact with a fixing member configured to fix the case to the attaching object, and when an axial length of the auxiliary mount rubber is assumed to be L1 and an axial length of the collar is assumed to be L2, the axial length L1 of the auxiliary mount rubber and the axial length L2 of the collar are set so that:

L1 ≤L2 is satisfied.

5. The motor device equipped with the speed reduction mechanism according to claim 4, wherein the auxiliary mount rubber includes a small diameter section and a pair of large diameter sections provided on both ends of the small diameter section in the axial direction of the output shaft, and the auxiliary mount rubber is mounted at the auxiliary attachment section in a state in which a clearance is provided between the auxiliary attachment section and at least one of the small diameter section and the large diameter sections.

6. The motor device equipped with the speed reduction mechanism according to claim 5, wherein the clearance is provided between the auxiliary attachment section and the small diameter section.

7. The motor device equipped with the speed reduction mechanism according to claim 5, wherein the clearance is provided between the auxiliary attachment section and the large diameter sections.

8. The motor device equipped with the speed reduction mechanism according to claim 1, wherein the main mount includes:

a main attachment section integrally formed with the case;

a cylindrical main mount rubber mounted at the main attachment section; and a cylindrical main collar disposed on an inner side of the main mount rubber in a radial direction thereof coaxially with the main mount rubber, wherein a hardness of the auxiliary mount rubber is lower than a hardness of the main mount rubber.

9. The motor device equipped with the speed reduction mechanism according to claim 1, wherein the pair of main mounts are provided on the side/area of the case where the output shaft is located, and the pair of main mounts are provided so as to face each other on the same side/area of the case where the output shaft is located.

* * * * *